United States Patent
Rhee et al.

(10) Patent No.: US 7,359,357 B2
(45) Date of Patent: Apr. 15, 2008

(54) METHOD AND APPARATUS FOR TRANSMITTING AND RECEIVING BROADCAST DATA USING OUTER-CODING

(75) Inventors: Jong-Hun Rhee, Suwon-si (KR); Su-Yean Kim, Incheon (KR); Min-Goo Kim, Yongin-si (KR); Beom-Sik Bae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 441 days.

(21) Appl. No.: 11/083,341

(22) Filed: Mar. 18, 2005

(65) Prior Publication Data
US 2005/0243775 A1 Nov. 3, 2005

(30) Foreign Application Priority Data
Mar. 18, 2004 (KR) ............ 10-2004-0018211

(51) Int. Cl.
*H04B 7/212* (2006.01)
(52) U.S. Cl. ................................. 370/336
(58) Field of Classification Search .......... 370/336, 370/347; 455/91, 130
See application file for complete search history.

(56) References Cited

U.S. PATENT DOCUMENTS

| 5,949,790 A | 9/1999 | Pehkonen et al. |
| 6,219,816 B1 | 4/2001 | Tezuka |
| 6,519,294 B1 | 2/2003 | Shiraishi et al. |
| 2005/0243775 A1* | 11/2005 | Rhee et al. ........... 370/336 |

* cited by examiner

*Primary Examiner*—William D. Cumming
(74) *Attorney, Agent, or Firm*—Roylance, Abrams, Berdo & Goodman, LLP

(57) ABSTRACT

A method and apparatus for transmitting and receiving a broadcast service in a mobile communication system which outer-codes frames for a plurality of broadcast services and Time Domain Multiplex (TDM)-transmits the outer-coded frames. A transmitter transmits a broadcast parameter message comprising information indicating a specific sub-buffer in which respective broadcast services are stored. A receiver for receiving the broadcast parameter message from the transmitter, and maps the sub-buffer to a corresponding sub-block mask based on the broadcast parameter message. The transmitter TDM-transmits the frames for the plurality of broadcast services per sub-block. The receiver selectively receives frames for a desired broadcast service using the sub-block mask and decodes the selectively received frames.

26 Claims, 14 Drawing Sheets

| SUB-BUFFER 0 (410) | SUB-BUFFER 1 (420) | SUB-BUFFER 2 (430) | SUB-BUFFER 3 (440) |
|---|---|---|---|
| A | B | C | D |
| E | A | C | D |
| A | B | C | D |
| E | A | C | D |
| F | F | F | F |
| F | F | F | F |
| A | B | C | D |
| E | A | C | D |
| A | B | C | D |
| E | A | C | D |
| A | B | C | D |
| E | A | C | D |
| F | F | F | F |
| F | F | F | F |
| A | B | C | D |
| E | A | C | D |

FIG.4
(PRIOR ART)

METHOD AND APPARATUS FOR TRANSMITTING AND RECEIVING BROADCAST DATA USING OUTER-CODING

PRIORITY

This application claims the benefit under 35 U.S.C. §119 (a) of an application entitled "Method and Apparatus for Transmitting/Receiving Broadcast Data Using Outer-Coding in a Mobile Communication System" filed in the Korean Intellectual Property Office on Mar. 18, 2004 and assigned Serial No. 2004-18211, the entire contents of which are hereby incorporated by reference.

BACKGROUND OF THE INVENTION

1. Field of the Invention

The present invention relates generally to a method and apparatus for transmitting broadcast data in a mobile communication system. More particularly, the present invention relates to a method and apparatus for transmitting and receiving broadcast data using outer-coding in a mobile communication system, provided to efficiently receive broadcast data transmitted using the outer-coding in a Code Division Multiple Access (CDMA) mobile communication system.

2. Description of the Related Art

A mobile communication system has developed from a system providing a voice service into a system capable of providing data services. The mobile communication system is now evolving into an advanced system capable of providing a broadcast service along with various data services. Such a system providing a broadcast service is currently undergoing various standardization negotiations in a $3^{rd}$ Generation Partnership Project 2 (3GPP2) group using CDMA technology. In the CDMA2000 1x Rev. D standard, which is one of the standards proposed by the 3GPP2 group to provide a broadcast service, the broadcast service is called "Broadcast Multicast Service (BCMCS)." In addition to the CDMA2000 1x Rev. D standard, the 3GPP2 camp has established other standards to provide the broadcast service.

A description will now be made of a broadcast service defined in the CDMA2000 1x Rev. D standard. In the following description, the BCMCS service defined in the CDMA2000 1x Rev. D standard will be referred to as a "broadcast service."

The broadcast service transmits block-interleaved frame-based broadcast data through one channel using a Time Domain Multiplex (TDM) scheme. The broadcast service can use Reed-Solomon coding which is error correction coding, also known as outer coding, in addition to inner coding, such as convolutional coding. In transmitting broadcast data, the use of the TDM scheme enables a receiver to receive a minimum number of selected frames when outer coding is not used therein, contributing to improved reception efficiency. However, in order to prevent a burst transmission error, Reed-Solomon coding is used, and the use of the Reed-Solomon coding is proposed in the CDMA2000 1x Rev. D standard.

A detailed description will now be made of a broadcast data transmission scheme currently proposed for the broadcast service.

FIG. 1 is a timing diagram for a description of a process providing a broadcast service with a TDM scheme according to the CDMA2000 1x Rev. D standard.

In FIG. 1, A, B, C, and D represent the types of broadcast services. In order to provide broadcast services, a base station (BS) time-domain-multiplexes the broadcast services before transmission to subscriber stations (SSs) as illustrated in FIG. 1. The broadcast services, which are time-domain-multiplexed before being transmitted, have a TDM period (TDM_PERIOD) 100. A plurality of TDM slots are allocated to the TDM period 100, and a plurality of TDM periods constitute one TDM super period.

The TDM period and the TDM super period will be described from the viewpoint of a service provided. If a subscriber station desires to receive a particular broadcast service, it can check the types of broadcast services that are transmitted through a predetermined channel after being time-domain-multiplexed. After checking the types of the broadcast services in this way, if a user of the subscriber station desires to watch and/or listen to a particular broadcast service, the subscriber station generates a message for requesting the broadcast service selected by the user and transmits the request message to a base station. In response, the base station generates information used for receiving the broadcast services which are transmitted after being time-domain-multiplexed as illustrated in FIG. 1, and transmits the generated information to the subscriber station. The generated information used for receiving the broadcast services, which are provided after being time-domain-multiplexed, is transmitted using a message format of Table 1. Tables 2 and 3 are provided to further describe the information transmitted using the message format of Table 1.

TABLE 1

| Message Field | Number of Bits |
|---|---|
| TDM_USED_IND | 1 |
| TDM_SLOT_LENGTH | 0 or 2 |
| TDM_PERIOD | 0 or 2 |
| TDM_MASK | 0 or (4, 8, or 16) |
| TDM_SUPER_PERIOD_MASK | 0 or 4 |

In Table 1, a TDM_USED_IND field is comprised of 1 bit and indicates whether a provided broadcast service is transmitted after being time-domain-multiplexed. If broadcast service data is transmitted after being time-domain-multiplexed, the succeeding values are added. Therefore, if the fields, other than the TDM_USED_IND field, illustrated in Table 1 have 0 number of bits, it means that Time Domain Multiplexing is not used. In addition, a TDM_SLOT_LENGTH field 110 has a 2-bit value when Time Domain Multiplex is used, and as illustrated in FIG. 1, it indicates a length of time included in one TDM period 100. A TDM_PERIOD field of Table 1 indicates the number of slots included in the TDM period 100, and has a 2-bit value when Time Domain Multiplex is used. In addition, a TDM_MASK field has a value using 4 bits, 8 bits or 16 bits, and indicates a specific slot in the TDM period 100, in which a broadcast service requested by the user is included. In FIG. 1, an example in which the TDM_MASK field has a 4-bit value is shown by reference numeral 120. Finally, in Table 1, a TDM_SUPER_PERIOD_MASK field has a value of 0 bits or 4 bits according to whether or not a super frame period is used. The TDM_SUPER_PERIOD_MASK field has a 4-bit value when the super frame period is used, and an example thereof is shown by reference numeral 130 in FIG. 1.

Table 2 illustrates a matching relation between the TDM_SLOT_LENGTH parameter values and the TDM_PERIOD parameter values when the information of Table 1 is transmitted.

TABLE 2

| TDM_SLOT_LENGTH (binary) | Length of the TDM slot | TDM_PERIOD (binary) | TDM Period |
|---|---|---|---|
| 00 | 20 ms | 00 | 4 slots |
| 01 | 40 ms | 01 | 8 slots |
| 10 | 80 ms | 10 | 16 slots |
| 11 | Reserved | 11 | Reserved |

In the TDM_SLOT_LENGTH field, 'Reserved' means that a corresponding parameter is unused. Table 3 illustrates a matching relation between the TDM periods and the TDM slot lengths.

TABLE 3

| Slot Length | TDM Period | | |
|---|---|---|---|
| | 4 slots | 8 slots | 16 slots |
| 20 ms (1 frame) | 16 frames (I) | 32 frames (II) | 64 frames (III) |
| 40 ms (2 frames) | 32 frames (IV) | 64 frames (V) | 128 frames (VI) |
| 80 ms (4 frames) | 64 frames (VII) | 128 frames (VIII) | 256 frames (IX) |

Table 3 illustrates a matching relation between the number of slots included in a TDM period and the number of frames transmitted within each TDM period according to a slot length. As can be understood from Table 3, the possible number of transmitted frames becomes a minimum of 16 frames up to a maximum of 256 frames according to the number (4, 8 or 16) of slots in the TDM period 100 and the slot length (20, 40 or 80 ms).

Once a subscriber station receives the information of Table 1, it can receive data of a corresponding frame. A detailed description thereof will now be made with reference to FIG. 1. If a particular user desires to receive a broadcast service A, for instance, a value denoted by reference numeral 121 is transmitted as a TDM_MASK value of Table 1. A value '1010' is transmitted as a TDM_MASK value, which is transmitted to a subscriber station desiring to listen to the broadcast service A. In this way, a value '0100' denoted by reference numeral 122, for instance, will be transmitted as a TDM_MASK value, which is transmitted to a subscriber station desiring to listen to a broadcast service B. A value '0001' denoted by reference numeral 123, for instance, will be transmitted as a TDM_MASK value which is transmitted to a subscriber station desiring to listen to a broadcast service C. A value '1010' denoted by reference numeral 124, for instance, will be transmitted as a TDM_MASK value, which is transmitted to a subscriber station desiring to listen to a broadcast service D.

The TDM_MASK for the broadcast service A and the TDM_MASK for the broadcast service D indicate that the broadcast service A and the broadcast service D are transmitted in a crossing way at the same reception point, and this is distinguished by a TDM_SUPER_PERIOD_MASK value. That is, for the broadcast services A, B, C and D, TDM_SUPER_PERIOD_MASK values are set as shown by reference numeral 130, and reference numerals 131, 132, 133, and 134 indicate corresponding broadcast services transmitted for certain TDM periods.

The CDMA2000 1x Rev. D standard calls for Reed-Solomon scheme-based outer coding to be used with a broadcast service. The Reed-Solomon scheme-based outer coding is performed at 64-frame periods as defined in a BCMCS physical layer standard, and the 64 frames are encoded through 4 sub-buffers before being transmitted. With reference to FIG. 2, a description will now be made of a broadcast service scheme using the Reed-Solomon scheme-based outer coding.

FIG. 2 is a diagram illustrating the operation Reed-Solomon encoding as outer coding of broadcast service data according to the CDMA2000 1x Rev. D standard.

In FIG. 2, 4 sub-buffers sub-buffer#0 (210), sub-buffer#1 (220), sub-buffer#2 (230) and sub-buffer#3 (240) are illustrated as defined in the standard. Because the Reed-Solomon encoding is performed at 64-frame periods as defined in the BCMCS physical layer standard, the 4 sub-buffers 210, 220, 230 and 240 have a structure capable of storing a total of 64 frames. Therefore, each of the sub-buffers 210, 220, 230 and 240 is constructed such that it can store 16 frames. Actually, however, the number of frames stored in each of the sub-buffers 210, 220, 230 and 240 is set to a predetermined number k (where k is an integer which is smaller than 16), in order to perform Reed-Solomon encoding. Therefore, k frames are stored in first k areas of each of the sub-buffers 210, 220, 230 and 240, and the remaining areas of each of the sub-buffers 210, 220, 230 and 240 are empty. Parity frames which are Reed-Solomon encoded frames are stored in the empty areas. In this manner, 16 frames are filled in each of the sub-buffers 210, 220, 230 and 240.

This process is shown as a Reed-Solomon (RS) encoding process in FIG. 2. That is, reference numerals 211, 221, 231 and 241 of FIG. 2 illustrate the buffer states after the Reed-Solomon encoding is performed. The sub-buffers 211, 221, 231 and 241 including the Reed-Solomon encoded frames perform sequential outputting. That is, after a first frame output from the first sub-buffer 211 is transmitted, a first frame from the second sub-buffer 221 is transmitted, and then a first frame of the third sub-buffer 231 is transmitted. Finally, after a first frame of the fourth sub-buffer 241 is transmitted, a second frame of the first sub-buffer 211 is transmitted.

Illustrated in the right-hand side of FIG. 2 is the transmission order of the frames stored in the sub-buffers 211, 221, 231 and 241, for the convenience of description. That is, reference numeral 212 represents the transmission order of the frames stored in the sub-buffer 211, reference numeral 222 represents the transmission order of the frames stored in the sub-buffer 221, reference numeral 232 represents the transmission order of the frames stored in the sub-buffer 231, and reference numeral 242 represents the transmission order of the frames stored in the sub-buffer 241. For example, regarding the first sub-buffer 211, a first frame is transmitted firstly, a second frame is transmitted fifthly, and a third frame is transmitted ninthly. Also, the frames stored in the other sub-buffers 221, 231 and 241 are transmitted in the same method.

With reference to FIG. 3, a description will now be made of an example in which the frames are transmitted in a TDM super period and a TDM period.

FIG. 3 is a timing diagram for transmission of broadcast service data in a case where data for 6 broadcast services is transmitted using the TDM/Reed-Solomon scheme. Referring to FIG. 3, a TDM super period 300 includes 4 TDM periods 310, 320, 330 and 340. Broadcast service frames A, B, C, D, E and F for different broadcast services are transmitted for the respective TDM periods 310, 320, 330 and 340.

When a subscriber station, or a reception side, receives the frames transmitted in the manner illustrated in FIG. 3, the subscriber station should receive data per each sub-buffer for a corresponding sub-block. Further, the subscriber station should receive not only the frames for its own broadcast service but also the frames for other broadcast services, transmitted through the corresponding sub-buffer, in order to enable decoding. The reason why the subscriber station receives not only the frames for its own broadcast service but also the frames for other broadcast services through the same sub-buffer is because the Reed-Solomon scheme is used as outer coding as described above with reference to FIG. 2. This will be described in more detail with reference to FIG. 4.

FIG. 4 is a diagram illustrating the respective sub-buffers in which transmission data for the broadcast services provided in the method of FIG. 2 is stored.

Referring to FIG. 4, transmission frame data is stored in first to fourth sub-buffers 410, 420, 430 and 440. It is assumed that FIG. 4 is equal to FIG. 3 in terms of a data transmission method. For example, the frames for 3 broadcast services A, E and F are stored in the first sub-buffer 410, the frames for 3 broadcast services A, B and F are stored in the second sub-buffer 420, the frames for 2 broadcast services C and F are stored in the third sub-buffer 430, and the frames for 2 broadcast services D and F are stored in the fourth sub-buffer 440. The last several frames for the respective sub-buffers 410, 420, 430 and 440 are stored as parity frames for Reed-Solomon encoding.

Therefore, a subscriber station desiring to receive a particular broadcast service cannot actually enjoy the advantage of TDM due to the multiple broadcast service frames transmitted in the foregoing manner. That is, the subscriber station cannot perform Reed-Solomon decoding unless it receives the full data in sub-buffers for the corresponding sub-blocks through which its desired broadcast service is transmitted.

Therefore, in the broadcast service to which the outer coding is applied, the subscriber station will unnecessarily receive other broadcast services in order to receive a particular service.

SUMMARY OF THE INVENTION

It is, therefore, an object of the present invention to provide a method and apparatus for transmitting and receiving broadcast data using outer-coding in a mobile communication system so as to minimize the number of data bits to be decoded, by selectively receiving only desired broadcast data in a broadcast service provided with the outer coding and a Time Domain Multiplex (TDM) scheme.

It is another object of the present invention to provide a method and apparatus for transmitting and receiving broadcast data using outer-coding in a mobile communication system so as to reduce the complexity and the power consumption of a receiver by minimizing the number of data bits to be decoded in a broadcast service provided with the outer coding and a TDM scheme.

In accordance with one aspect of the present invention, there is provided a method for providing a broadcast service in a mobile communication system which outer-codes frames for a plurality of broadcast services, the method comprising the steps of: generating a broadcast parameter message comprising information indicating at least one sub-buffer in which frames for a requested broadcast service are stored; and transmitting the broadcast parameter message.

In accordance with another aspect of the present invention, there is provided a method comprising generating a broadcast data stream having data frames for each of a plurality of broadcast services in a mobile communication system; and storing the broadcast data stream in a plurality of buffers so that each buffer contains data frames of no more than one broadcast service; outer-coding the stored data frames of each buffer; and transmitting the outer-coded data frames.

In accordance with further aspect of the present invention, there is provided a method for receiving a broadcast service in a mobile communication system which outer-codes frames for a plurality of broadcast services, the method comprising the steps of: receiving a broadcast parameter message comprising information indicating at least one sub-buffer in which frames for a desired broadcast service are stored; and selectively receiving the frames for the desired broadcast service based on the information.

In accordance with still another aspect of the present invention, there is provided a transmission apparatus for providing a broadcast service in a mobile communication system which outer-codes frames for a plurality of broadcast services, the apparatus comprising: a message generator for generating a broadcast parameter message comprising information indicating each sub-buffer in which frames for each broadcast service are stored; and a radio frequency (RF) module for transmitting the broadcast parameter message.

In accordance with still another aspect of the present invention, there is provided a transmission apparatus for providing a broadcast service in a mobile communication system which outer-codes frames for a plurality of broadcast services, the apparatus comprising: a controller for demuxing broadcast data per sub-blocks to assign the broadcast data to at least one sub-buffer in which frames for a requested broadcast service are stored; an outer encoder for outer-coding the frames for the plurality of broadcast services per sub-buffers; and a radio frequency (RF) module for transmitting the outer-coded frames for the plurality of broadcast services.

In accordance with still another aspect of the present invention, there is provided A reception apparatus for receiving a broadcast service in a mobile communication system which outer-codes frames for a plurality of broadcast services, the apparatus comprising: a radio frequency (RF) module for receiving from a transmitter a broadcast parameter message comprising information indicating a specific sub-buffer in which frames for a desired broadcast service are stored and selectively receiving the frames for the desired broadcast service among the plurality of broadcast service; a decoder for decoding the selectively received frames for a broadcast service, stored in the indicated sub-buffer; and a controller for instructing the radio frequency (RF) module selectively to receive the frames for the desired broadcast service among the plurality of broadcast service based on the information.

BRIEF DESCRIPTION OF THE DRAWINGS

The above and other objects, features and advantages of the present invention will become more apparent from the following detailed description when taken in conjunction with the accompanying drawings in which:

FIG. 4 is a diagram illustrating the respective sub-buffers in which transmission data for the broadcast services provided in the conventional method of FIG. 2 is stored;

Throughout the drawings, it should be understood that like reference numbers refer to like features, elements and structures.

DETAILED DESCRIPTION OF EXEMPLARY EMBODIMENTS

An embodiment of the present invention will now be described in detail with reference to the annexed drawings. In the following description, a detailed description of known functions and configurations incorporated herein has been omitted for the sake of conciseness.

Figure 5:
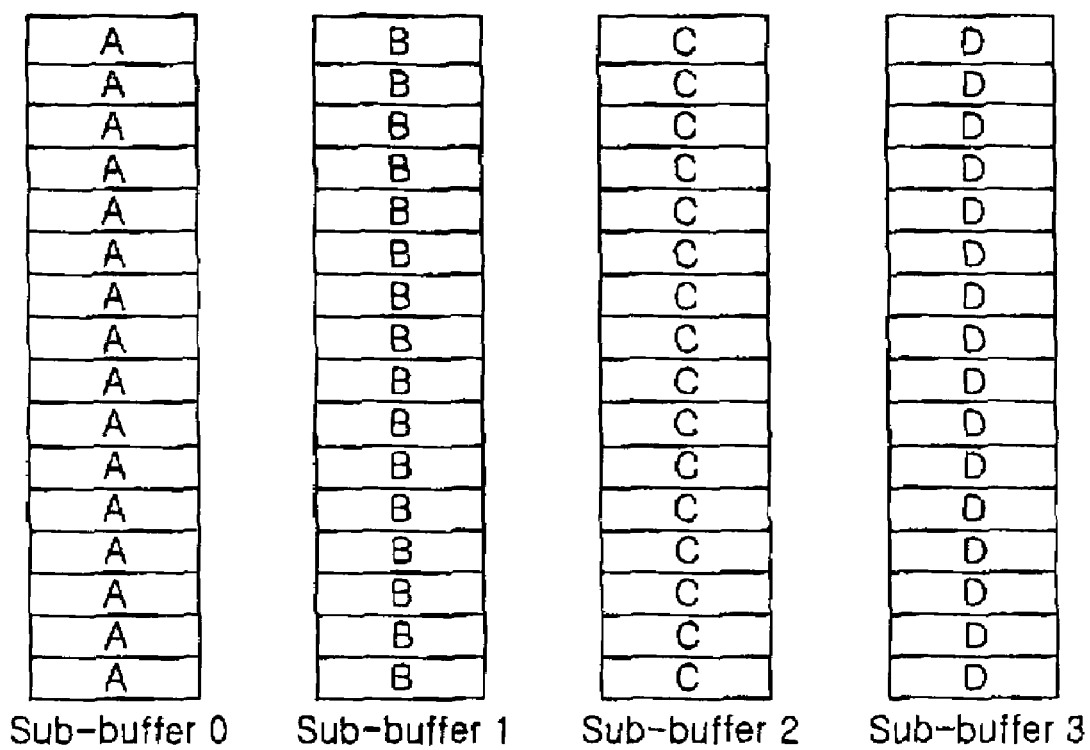
FIG. 5 is a diagram illustrating an exemplary method in which broadcast data is separately stored for respective sub-buffers according to an embodiment of the present invention.

In an embodiment of the present invention, only the frames for the same broadcast service are stored in each sub-buffer of a receiver as illustrated in FIG. 5. In FIG. 5, it is assumed that the receiver comprises four sub-buffers. Although A, B, C and D represent different broadcast services in FIG. 5, that is for illustration purposes only and the broadcast service is not necessarily limited to being a plurality of different broadcast services. For example, A and B can be frames constituting one broadcast service, while C and D may constitute another broadcast service. Therefore, FIG. 5 represents the maximum number of types of separable broadcast services in this embodiment.

With reference to FIGS. 6A to 6F, a description will now be made of the maximum number of services that a receiver can receive when frames for each broadcast service are stored in the manner of FIG. 5. That is, FIGS. 6A and 6F individually illustrate possible patterns of broadcast services according to a Time Domain Multiplex (TDM) scheme. The maximum number of available services for each of the patterns shown in FIGS. 6A to 6F is illustrated in Table 4.

TABLE 4

| | TDM Period | | |
| Slot Length | 4 slots | 8 slots | 16 slots |
| --- | --- | --- | --- |
| 20 ms (1 frame) | 4 (I) | 4 (II) | 4 (III) |
| 40 ms (2 frames) | 2 (IV) | 2 (V) | 4 (VI) |
| 80 ms (4 frames) | 1 (VII) | 2 (VIII) | 4 (IX) |

Figure 6A:
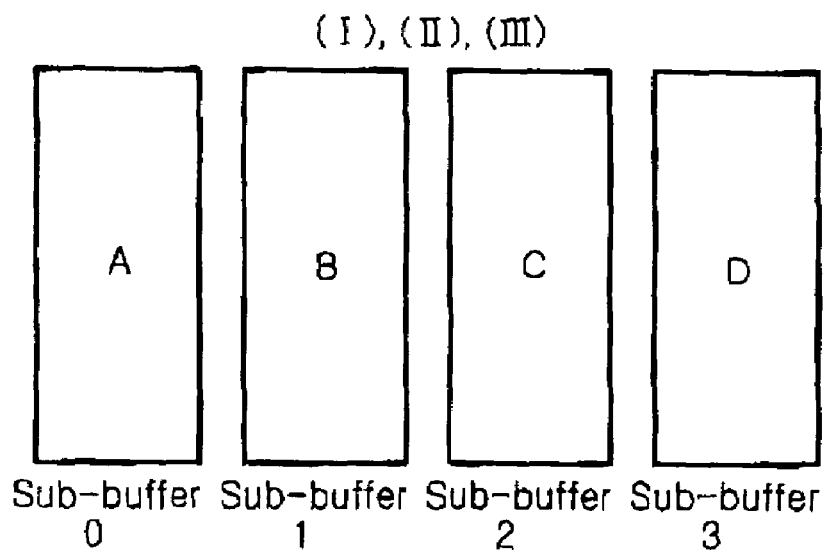
FIGS. 6A and 6F illustrate possible patterns of broadcast services based on a TDM scheme using the exemplary broadcast data storing method of FIG. 5.
Figure 6B:
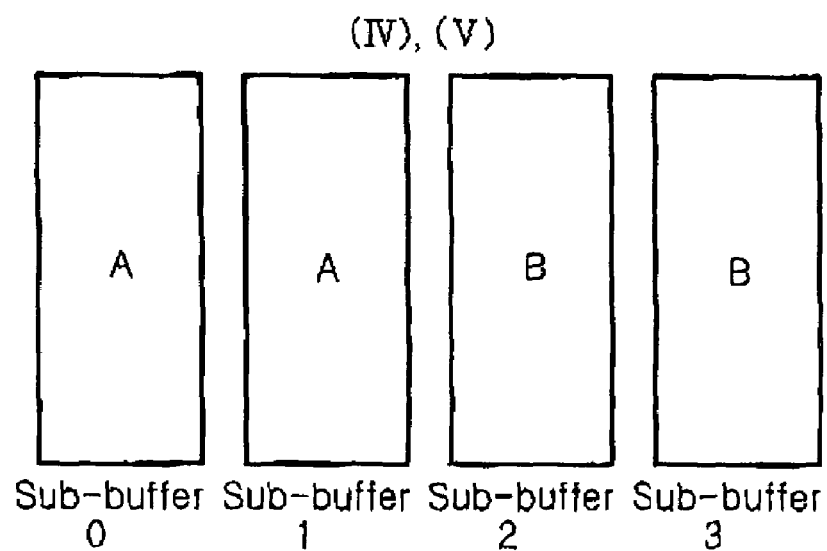

In Table 4, (I), (II) and (III) represent a case where the total length of slots included in one TDM period is 20 ms and the number of the slots is 4, 8 and 16, respectively. In this case, the maximum number of services that a receiver can receive is 4 (A, B, C and D) as illustrated in FIG. 6A. In addition, (IV) and (V) represent a case where the total length of slots included in one TDM period is 40 ms and the number of the slots is 4 and 8, respectively. In this case, the maximum number of services that a receiver can receive is 2 (A and B) as illustrated in FIG. 6B.

Figure 6C:
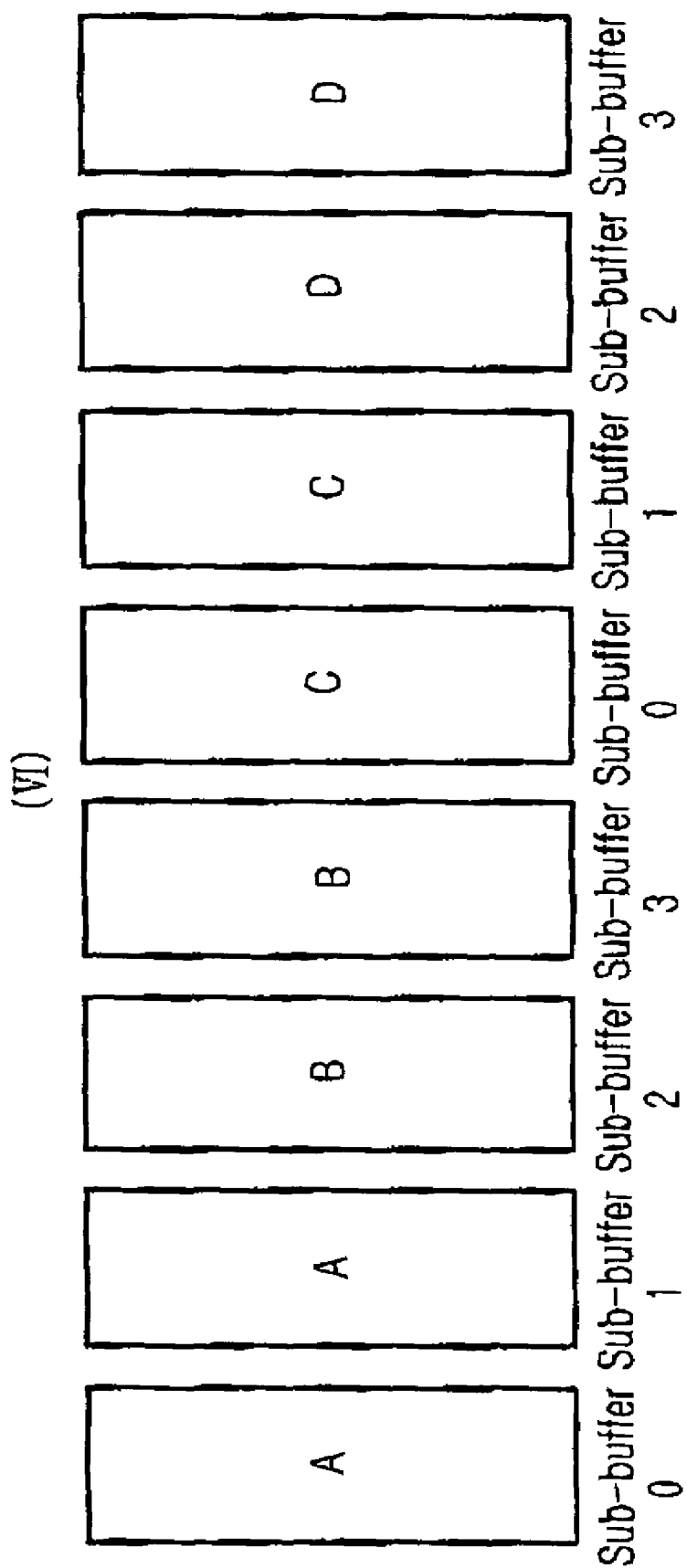
Figure 6D:
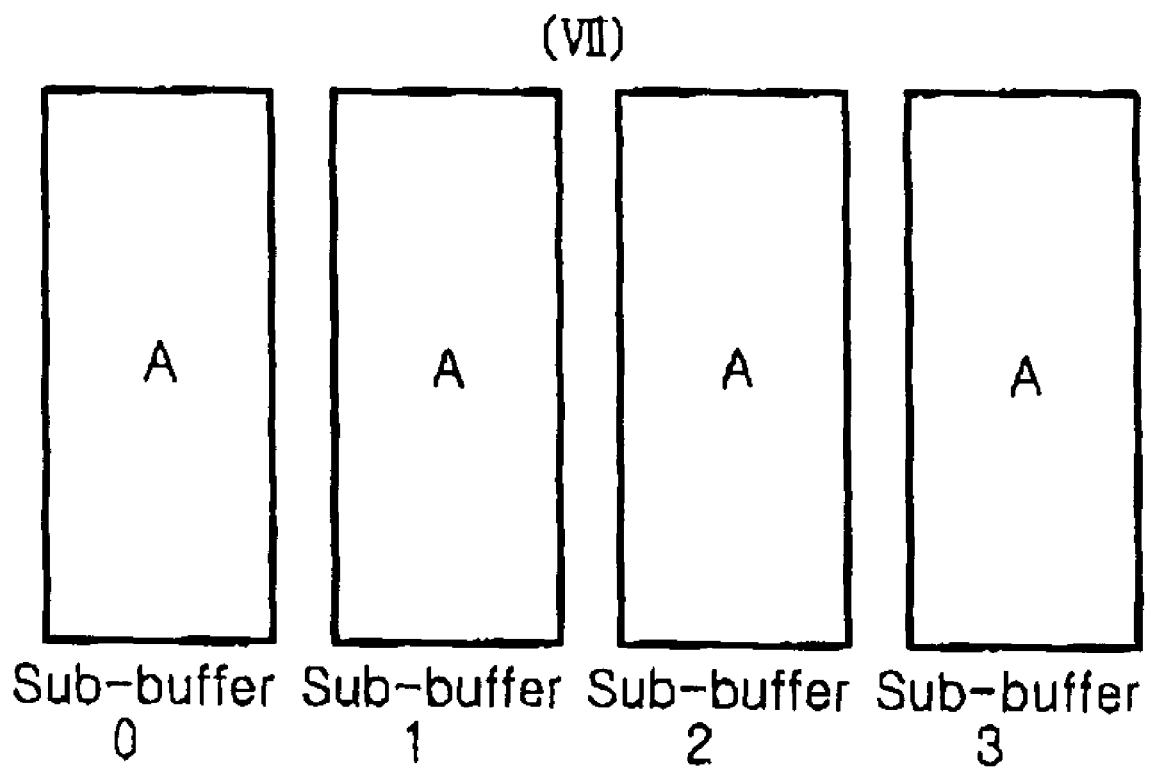
Figure 6E:
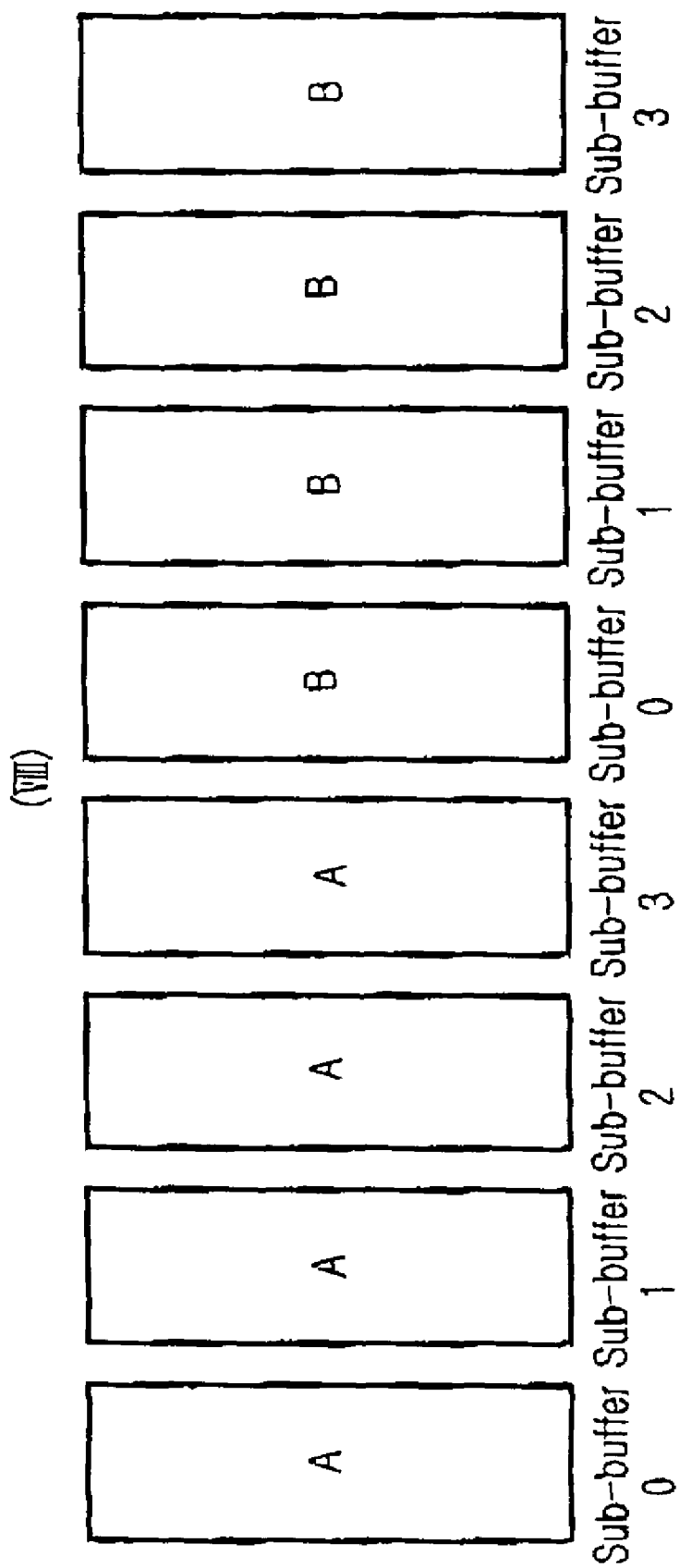
Figure 6F:
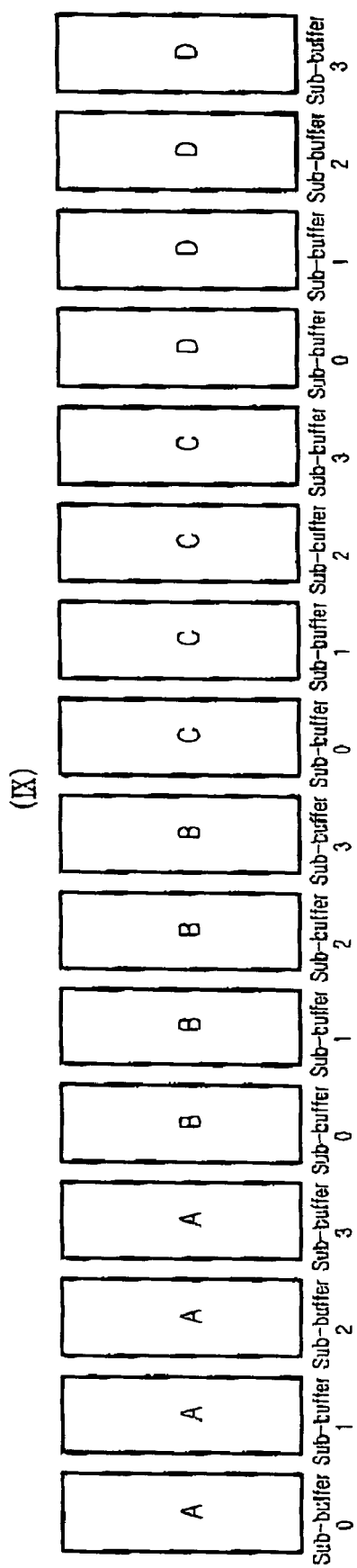

Further, (VI) represents a case where the total length of slots included in one TDM period is 40 ms and the number of the slots is 16. In this case, the maximum number of services that a receiver can receive is 4 (A, B, C and D) as illustrated in FIG. 6C. Summarizing Table 4, the maximum number of services that a receiver can receive is 1 for a pattern (VII), 2 for patterns (IV), (V) and (VIII), and 4 for patterns (I), (II), (III), (VI) and (IX).

The following results can be derived from FIGS. 6A to 6F and Table 4.

1. (I), (II) and (III) all represent the same TDM scheme. In this case, because the pattern (I) requires the minimum number of message bits, the TDM scheme for the pattern (I) is efficient for these patterns. Herein, the "message" refers to a message including parameter information of Table 4 provided from a base station to a subscriber station so that the subscriber station, or a receiver, can use a broadcast service (hereinafter referred to as a "broadcast parameter message").

2. Because (IV) and (V) can be expressed by (I), these patterns are represented by (I).

3. (VI) represents a TDM scheme independent of those for the other patterns.

4. Because (VII) provides only one service, it is not used.

5. Because (VIII) can be expressed by (VI), it is represented by (VI).

6. (IX) represents a TDM scheme independent of those for other patterns.

Therefore, TDM schemes that are efficient under the conventional broadcast parameter message format of Table 1 and Table 2 can all be expressed by either only (I), (VI) or (IX). When the respective services are uniformly mixed, the pattern (I) is superior in terms of a characteristic showing the shortest initial transmission delay time, and the pattern (I) can represent the other 8 patterns. However, the maximum number of services supportable by the pattern (I) is limited to 4, which is much smaller than the maximum number, 64, of supportable services for the case where an efficient TDM scheme is not considered.

Therefore, the embodiments of the present invention propose a broadcast data transmission method and apparatus for changing the broadcast parameter message wherein a receiver can efficiently receive broadcast data transmitted using Reed-Solomon coding and accept the number of broadcast channels expected to be greatly increased later while maintaining the frame reception scheme of FIG. 5. To this end, the embodiments of the present invention change the TDM_MASK field of Table 1, indicating frames for each broadcast service, into a sub-block based mask corresponding to a sub-buffer such that it designates each sub-buffer included in a receiver, stores only one broadcast service frame in each sub-buffer, and prevents the reception of frames for other broadcast services, thereby excluding unnecessary decoding that occurs in a conventional receiver, while securing a sufficient number of broadcast channels.

Table 5 illustrates a field format of the broadcast parameter message proposed by embodiments of the present invention. The broadcast parameter message preferably follows the following rules:
1. A signaling system for the case where the outer coding used should be different from a signaling system for the case where the outer coding is not used, in order to support a more flexible TDM scheme for the case where the outer coding is not used; and
2. For the case where the outer coding is used, one service should exist in each sub-buffer. To this end, the message should include a sub-block based mask instead of a frame based, in other words, a slot based mask.

TABLE 5

| Message Field | Number of Bits |
|---|---|
| TDM_USED_IND | 1 |
| TDM_SUB_BLOCK_LENGTH | 0 or 2 |
| TDM_SUB_BLOCK_PERIOD | 0 or 2 |
| TDM_SUB_BLOCK_MASK | 0 or (4, 8, or 16) |
| TDM_SUB_BLOCK_SUPER_PERIOD_MASK | 0 or 4 |

Because the 'Number of Bits' field in Table 5 is equal to that of Table 1, the new message is compatible with the conventional message, and all the message fields of Table 1 are changed to new message fields based on sub-blocks of a receiver, thereby maintaining the basic contents thereof.

A receiver that actually receives a broadcast service analyzes either the conventional message fields or the new message fields according to whether outer coming is used or not.

Figure 1:
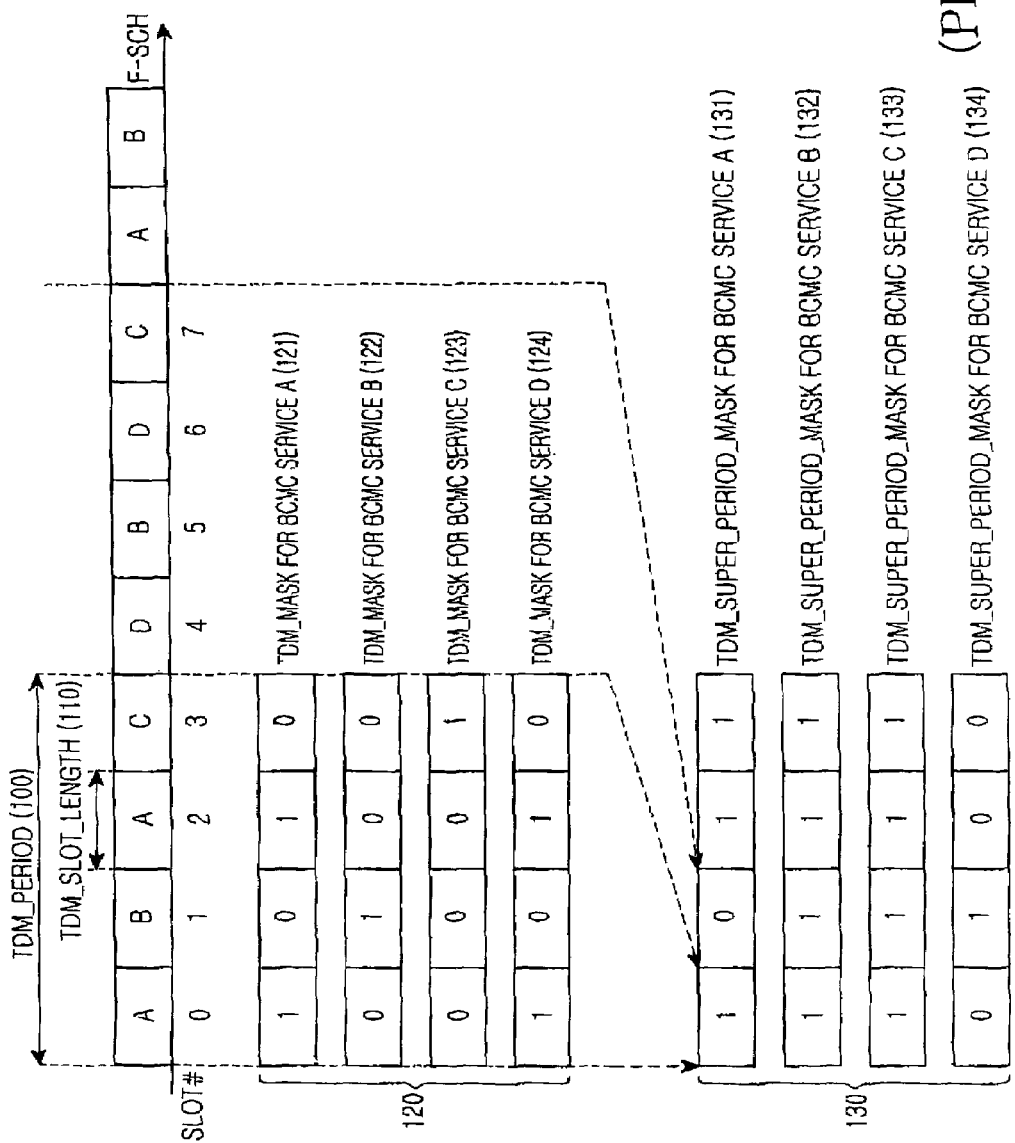
FIG. 1 is a timing diagram a process for providing a broadcast service with a TDM scheme according to the CDMA2000 1x Rev. D standard.
Figure 2:
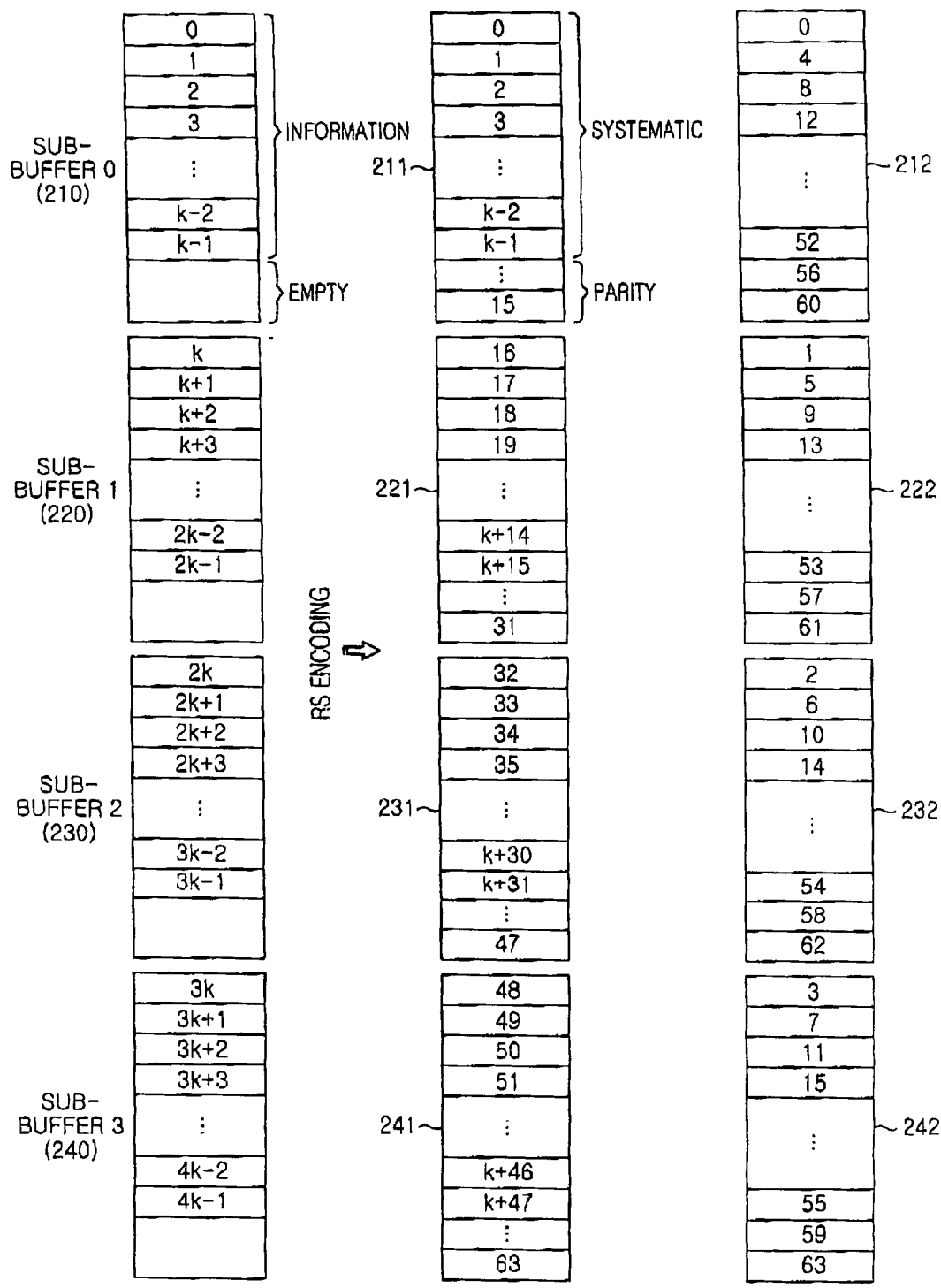
FIG. 2 is a diagram of an operation for performing Reed-Solomon encoding as outer coding on broadcast service data according to the CDMA2000 1x Rev. D standard.
Figure 3:
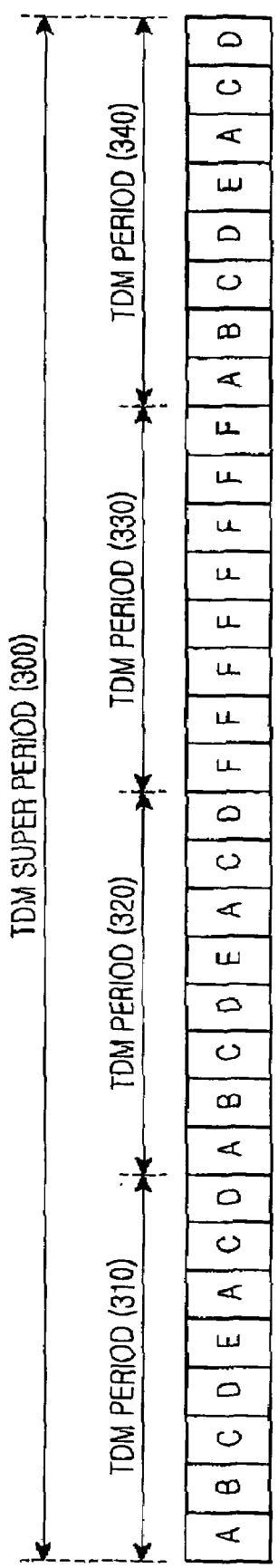
FIG. 3 is a timing diagram illustrating the conventional transmission of broadcast service data in a case where data for six broadcast services is transmitted using the TDM/Reed-Solomon scheme.
Figure 7:
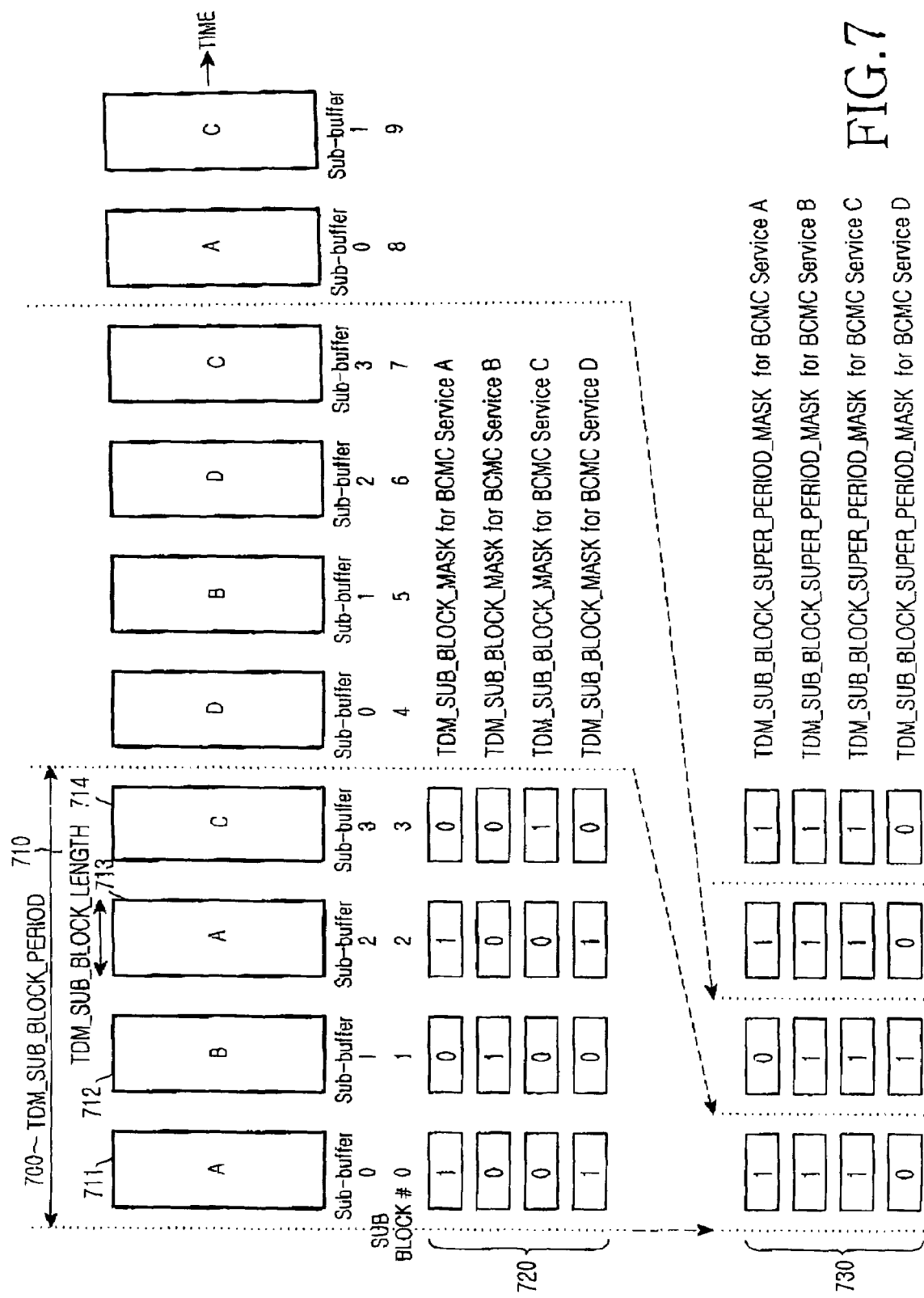
FIG. 7 is a timing diagram of a method for providing a TDM broadcast service based on a sub-block according to an embodiment of the present invention.

FIG. 7 is a timing diagram for a description of a method for providing a TDM broadcast service based on a sub-block according to an embodiment of the present invention. This follows the conventional CDMA2000 1x Rev. D standard of FIG. 1 except for the sub-block based broadcast service transmission and reception scheme.

In FIG. 7 and Table 5, TDM_SUB_BLOCK_LENGTH 710 has a 2-bit value when TDM is used, and indicates a time length of sub-blocks included in one TDM_SUB_BLOCK_PERIOD 700. The TDM_SUB_BLOCK_PERIOD 700 has a 2-bit value when TDM is used. Further, TDM_SUB_BLOCK_MASK 720 has a value of 4 bits, 8 bits or 16 bits, and indicates in which of sub-buffers 711, 712, 713 and 714 a broadcast service requested by a user should be stored (received) in a TDM period. In FIG. 7, a case where TDM_SUB_BLOCK_MASK is set to a 4-bit value is denoted by reference numeral 720.

Finally, TDM_SUB_BLOCK_SUPER_PERIOD_MASK has a value of 0 bits or 4 bits according to whether a super frame is used or not. The TDM_SUB_BLOCK_SUPER_PERIOD_MASK is set to a 4-bit value when a super frame is used, and denoted by reference numeral 730 in FIG. 7.

As described above, FIG. 7 shows TDM based on sub-buffers 711, 712, 713 and 714, which is TDM based on sub-buffers. That is, a receiver determines a sub-buffer to which the received frames belong by receiving the broadcast parameter message of Table 5, and then receives only the frames belonging to the corresponding sub-buffer. A sub-block index (sub_block_index) to which an $i^{th}$ received frame belongs is defined by Equation (1).

$$\text{sub\_block\_index} = (i \bmod 4) + 4 \times (\lfloor i/64 \rfloor \bmod \text{TDM\_SUB\_BLOCK\_PERIOD}) \quad \text{Equation (1)}$$

In Equation (1), 'mod' means a modulo operation, and '$\lfloor \ \rfloor$' means a maximum integer to which a value of i/64 approximates, when the value is not an integer. Based on Equation (1), for a sub-block mask arrangement in which sub-buffers are mapped to bits on a one-to-one basis, a receiver receives an $i^{th}$ transmission frame when a (sub_block_index)$^{th}$ value of the sub-block mask arrangement is 1, and does not receive the $i^{th}$ transmission frame when the (sub_block_index)$^{th}$ value of the sub-block mask arrangement is 0, thereby enabling TDM reception.

Here, both i and sub_block_index start from '0'. Regarding the i value, in Equation (1), the i value is set to '0' after a lapse of 20*FSCH_OUTER_CODE_OFFSETs[i] ms from a point where a CDMA system time is 0. In FIG. 7, a sub-block mask arrangement for a service A is {1,0,1,0,0, 0,0,0,1,0,1,0,1,0,1,0}. Therefore, a sub_block_index value of a 456$^{th}$ received frame becomes 12 in accordance with Equation (1), and because a corresponding sub-block mask value is 1 (i.e., {1,0,1,0,0,0,0,0,1,0,1,0,1,0,1,0}), a corresponding frame should be received. Sub-blocks received in this way are mapped to sub-buffers on a one-to-one basis.

If it is necessary to ostensibly indicate whether the sub-block based TDM is used, broadcast parameter messages of Table 6 and Table 7 can be formed using the Reserved bits in Table 2.

TABLE 6

| Message Field | Number of Bits |
|---|---|
| TDM_USED_IND | 1 |
| TDM_SLOT_LENGTH | 0 or 2 |
| TDM_SUB_BLOCK_PERIOD | 0 or 2 |
| TDM_SUB_BLOCK_MASK | 0 or (4, 8 or 16) |
| TDM_SUB_BLOCK_SUPER_PERIOD_MASK | 0 or 4 |

TABLE 7

| TDM_SLOT_LENGTH (binary) | Length of the TDM slot |
|---|---|
| 00 | 20 ms |
| 01 | 40 ms |
| 10 | 80 ms |
| 11 | TDM_SUB_BLOCK_USED |

Based on Table 6 and Table 7, it is possible to support a sub-block based TDM scheme, which is fully compatible with the conventional TDM scheme. Compared with the message of Table 5, the message of Table 6 does not have the TDM_SUB_BLOCK_LENGTH field, which means that the message is always based on sub-buffers. However, the maximum number of services supported by the new scheme is 16*4=64, which is equal to that of the conventional scheme. In addition, there is a method for lengthening the total period by extending the number of bits currently allocated for the TDM_SUB_BLOCK_MASK and the TDM_SUB_BLOCK_PERIOD. However, this method is inefficient compared with the foregoing method.

A description will now be made of a structure of a transmission apparatus, such as, a transmitter of a base station, to which an embodiment of the present invention is applied.

Figure 10:
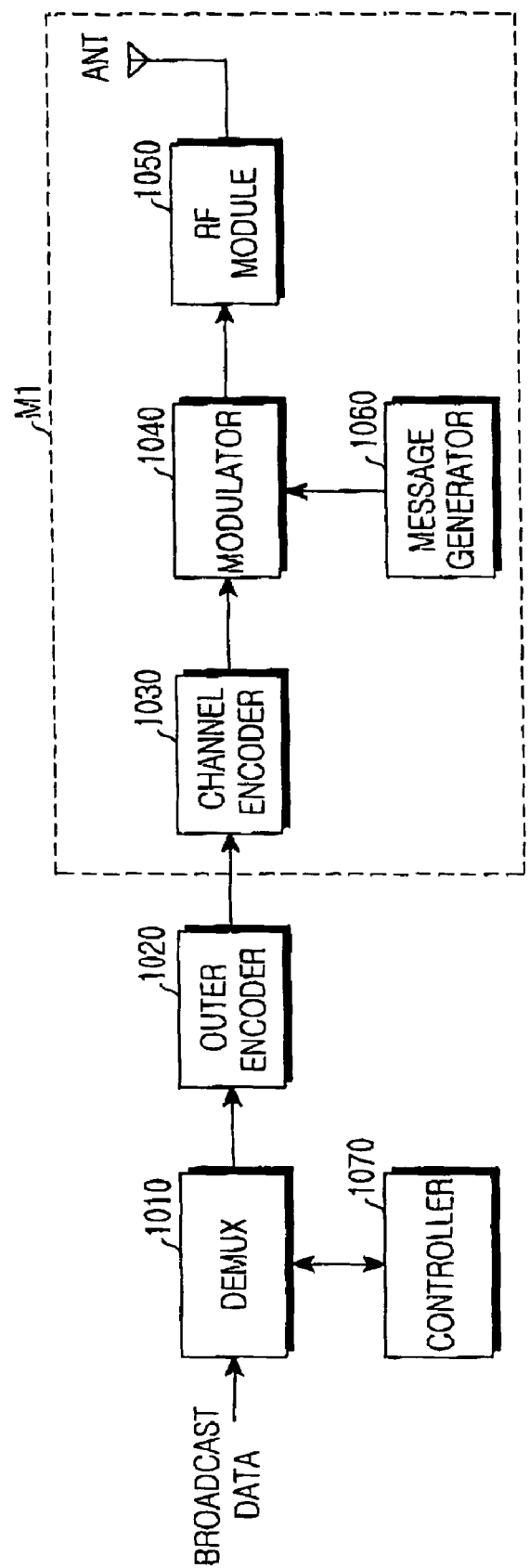
FIG. 10 is a block diagram illustrating a structure of a broadcast data transmission apparatus using Reed-Solomon coding according to an embodiment of the present invention.

An apparatus for implementing the timing scheme of FIG. 7 will be now be described with reference to FIG. 10. FIG. 10 is a block diagram illustrating a structure of a broadcast data transmission apparatus using Reed-Solomon coding according to an embodiment of the present invention. Although a broadcast parameter message is generated by a transmitter, or a base station, in an embodiment of the present invention, it can also be generated by a separate apparatus, such as a broadcast server.

When there is a broadcast service to be provided to a subscriber station, the transmission apparatus of FIG. 10 generates a broadcast parameter message, transmits the broadcast parameter message to the subscriber station, and then transmits broadcast data for each broadcast service to a wireless network based on the timing scheme of FIG. 7.

Referring to FIG. 10, to transmit broadcast data, a message generator 1060 generates a broadcast parameter message of Table 5 including TDM_SUB_BLOCK_SUPER_PERIOD_MASK and TDM_SUB_BLOCK_LENGTH information bits of FIG. 7 for TDM transmission and TDM_SUB_BLOCK_MASK indicating a sub-buffer in which frames for a broadcast service requested by a user are stored in a TDM period, and outputs the broadcast parameter message to a modulator 1040. The modulator 1040 modulates the broadcast parameter message output from the message generator 1060. A radio frequency (RF) module 1050 transmits the modulated broadcast parameter message to a wireless network via an antenna ANT. An operation of a subscriber station receiving the broadcast parameter message will be described in more detail later. In an alternative embodiment, the broadcast parameter message can be generated in the format of Table 6 and Table 7.

After transmission of the broadcast parameter message is completed, a controller 1070 controls a demultiplexer 1010 such that an input broadcast data stream is allocated (designated) to at least one sub-buffer in which frames for each broadcast service are stored. The demultiplexer 1010, under the control of the controller 1070, demultiplexes the broadcast data stream per sub-block for a corresponding sub-buffer. Consecutive frames constituting the broadcast data stream undergo time division every period uniquely designated to each broadcast service before being transmitted. An outer encoder 1020 performs Reed-Solomon encoding on input broadcast data from the demultiplexer 1010, and outputs the resultant data to a channel encoder 1030. Alternatively, a Cyclic Redundancy Check (CRC) inserter (not shown) for inserting CRC information for error check into the outer-coded broadcast data can be interposed between the outer encoder 1020 and the channel encoder 1030. The channel encoder 1030 performs channel coding, such as convolutional coding, on its input signal, and outputs the resultant signal to the modulator 1040. The modulated signal undergoes sub-block based TDM through the RF module 1050 and then is transmitted to a wireless network via the antenna ANT. One of a number of well-known modulation schemes can be selected for the modulation scheme used herein. In FIG. 10, reference numeral M1 denotes a broadcast parameter message transmission apparatus.

A description will now be made of a structure of a reception apparatus, such as a receiver of a subscriber station, to which an embodiment of the present invention is applied.

Figure 8:
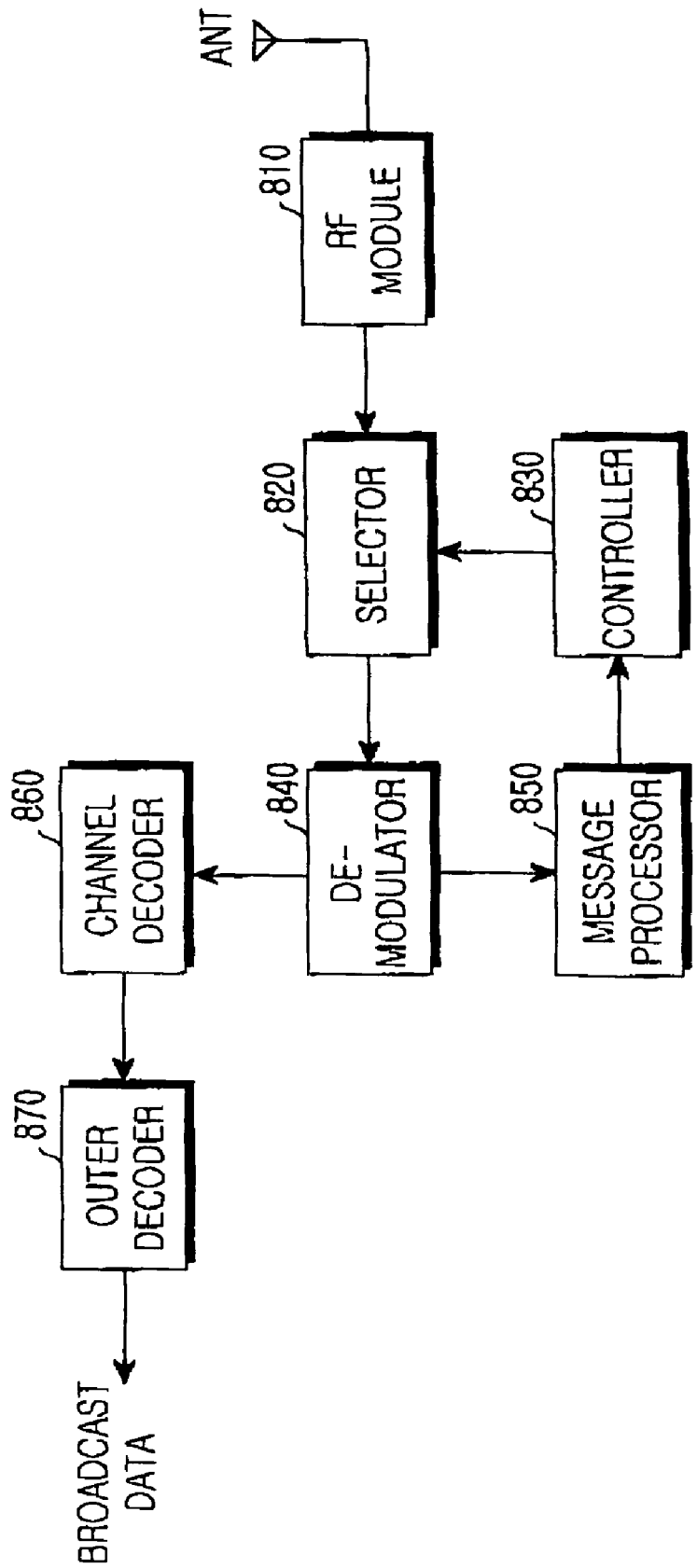
FIG. 8 is a block diagram illustrating a structure of a broadcast data reception apparatus using Reed-Solomon coding in a mobile communication system according to an embodiment of the present invention.

FIG. 8 is a block diagram illustrating a structure of a broadcast data reception apparatus using Reed-Solomon coding in a mobile communication system according to an embodiment of the present invention.

Referring to FIG. 8, if there is a broadcast service request from a user, the reception apparatus receives a broadcast parameter message of Table 5 from a base station through an antenna ANT and an RF module 810 preferably comprising a filter and a front-end unit, and the broadcast parameter message is delivered to a demodulator 840 through a selector 820. The broadcast parameters are transmitted through a control channel being different from a channel through which broadcast data is transmitted. A controller 830 recognizes the transmission of the broadcast parameters. The received broadcast parameter message is delivered to a message processor 850, and the message processor 850 analyzes the broadcast parameter message and delivers the analysis result to the controller 830. Based on the analysis results of the broadcast parameter message, the controller 830 determines the type of broadcast service, designates a sub-buffer in which frames for the corresponding broadcast service are stored, and maps arrangements of the TDM_SUB_BLOCK_MASK fields such that frames for other broadcast services should not be stored in the designated sub-buffer.

Thereafter, if frames for a broadcast service, received from the base station, are applied to the selector 820 through the antenna ANT and the RF module 810, the controller 830 calculates a sub-block index to which the received frames belong using Equation (1), and delivers the calculated sub-block index to the selector 820. The selector 820 passes only the frames for the broadcast service selected by the user using the sub-block index and the mapped TDM_SUB_BLOCK_MASK fields, and discards the remaining frames.

The broadcast frames selected by the selector 820 are delivered to the demodulator 840, and the demodulator 840 demodulates the selected broadcast frames and delivers the demodulated broadcast frames to a channel decoder 860. The channel decoder 860 performs channel decoding on the demodulated broadcast frames preferably using convolutional decoding or turbo coding. The output signal undergoes error check for frame data through a non-depicted CRC checker, and then undergo deinterleaving and Reed-Solomon encoding, generating error-corrected broadcast data. The sub-buffers illustrated in FIG. 7 can be included in the outer decoder 870, a separate internal memory, or a separate external memory.

Figure 9:
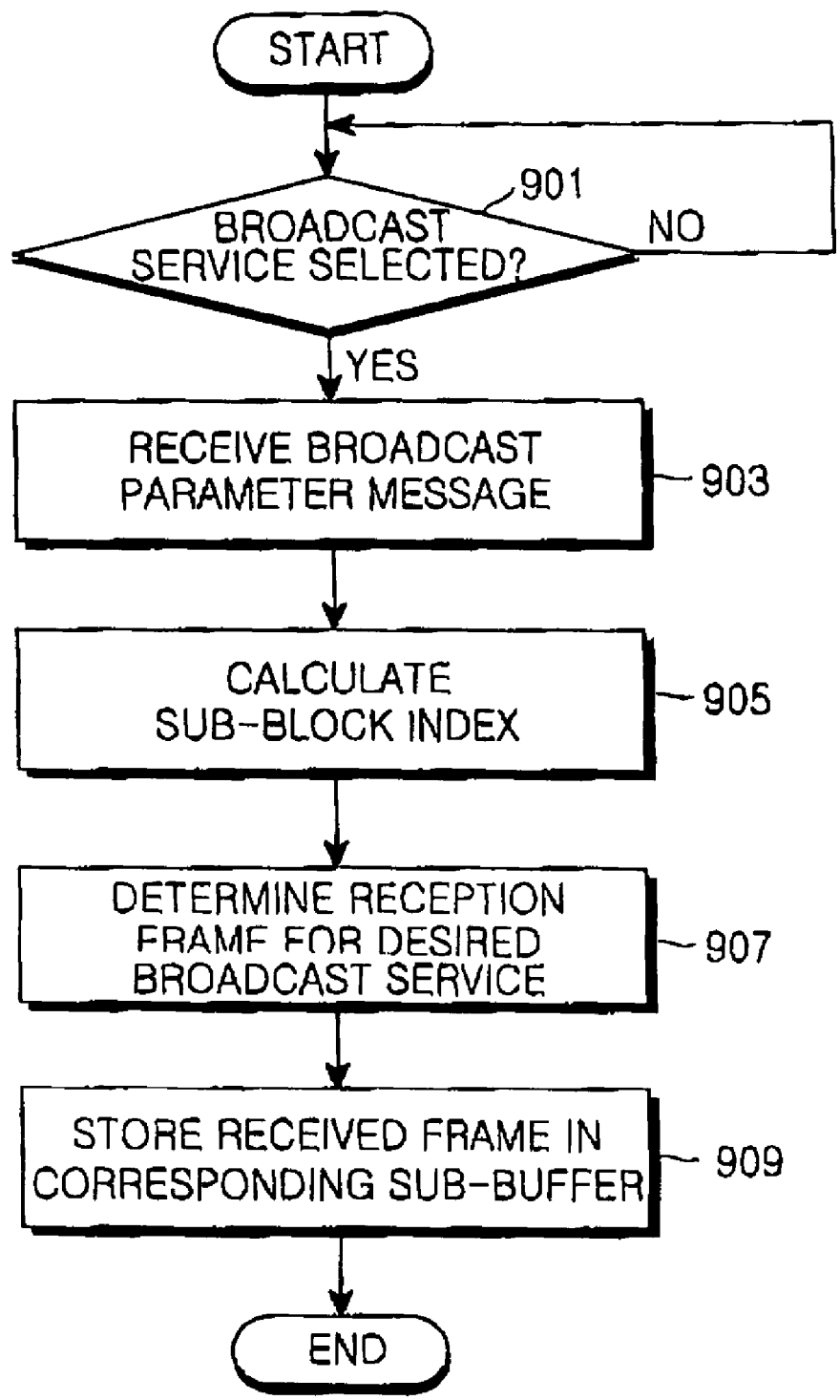
FIG. 9 is a flowchart illustrating a method for receiving broadcast data using Reed-Solomon coding in a mobile communication system according to an embodiment of the present invention.

With reference to FIG. 9, a description will now be made of a method for receiving broadcast data using Reed-Solomon coding in a mobile communication system according to an embodiment of the present invention.

Referring to FIG. 9, if a user desiring to receive a broadcast service selects a desired broadcast service through manipulation of its subscriber station in step 901, the subscriber station receives a broadcast parameter message transmitted from a base station in step 903. Upon receiving the broadcast parameter message, the controller 830 of the subscriber station delivers the received broadcast parameter message to the message processor 850 through the demodulator 840. Then the message processor 850 analyzes the received broadcast parameter message and delivers the analysis information to the controller 830. Based on the analyzed broadcast parameter message, the controller 830 maps arrangements of the TDM_SUB_BLOCK_MASK fields such that frames for the broadcast service selected by the user should be stored in a corresponding sub-buffer.

Thereafter, in step 905, the controller 830 calculates a sub-block index for broadcast frames transmitted by the TDM scheme in accordance with Equation (1). In step 907, the controller 830 compares the sub-block index with the TDM_SUB_BLOCK_MASK arrangements to determine reception frames for the selected broadcast service. Thereafter, in step 909, the controller 830 stores the received frames in a sub-buffer for the corresponding service. The transmission-controlled frames undergo decoding through the channel decoder 860 and the outer decoder 870 and then, are output as broadcast data that the user can watch. In this manner, the subscriber station can exclude the conventional unnecessary decoding process caused by Reed-Solomon encoding.

As described above, a subscriber station selectively receives only the frames for its desired broadcast service and decodes the received frames in a system providing a plurality of broadcast services, thereby minimizing the number of data bits to be decoded. In addition, using a TDM-based CDMA2000 1x Rev. D standard, embodiments of the present invention implement a receiver that prevents unnecessary power consumption and is lower in complexity than the conventional receiver by selectively receiving and decoding only the frames for a desired broadcast service. In addition, embodiments of the present invention implement a transmitter that generates a broadcast parameter message for the purpose of reducing power consumption and system complexity.

While the invention has been shown and described with reference to a certain embodiments thereof, it will be understood by those skilled in the art that various changes in form and details may be made therein without departing from the spirit and scope of the invention as defined by the appended claims.

What is claimed is:

1. A method for providing a broadcast service in a mobile communication system which outer-codes frames for a plurality of broadcast services, the method comprising the steps of:
generating a broadcast parameter message comprising information indicating at least one sub-buffer in which frames for a requested broadcast service are stored; and
transmitting the broadcast parameter message.

2. The method of claim 1, wherein the information indicating at least one sub-buffer comprises mask information per sub-block.

3. The method of claim 2, wherein the broadcast parameter message comprises mask information of a super frame period predefined for a plurality of sub-blocks.

4. The method of claim 1, wherein the at least one sub-buffer is selected from 4 different sub-buffers included in the receiver.

5. The method of claim 1, further comprising the step of:
indicating whether to perform a sub-block based TDM transmission using a reserved bit of another broadcast parameter message defined in a slot based TDM transmission, if the sub-block based TDM transmission and the slot based TDM transmission are selectively used.

6. The method of claim 1, further comprising the steps of:
if a slot based TDM transmission is performed, transmitting another broadcast parameter message including TDM mask information indicating frames for the requested broadcast service.

7. A method comprising:
generating a broadcast data stream having data frames for each of a plurality of broadcast services in a mobile communication system;
storing the broadcast data stream in a plurality of buffers so that each buffer contains data frames of no more than one broadcast service; and
outer-coding the stored data frames of each buffer; and transmitting the outer-coded data frames.

8. The method of claim 7, wherein the generating a broadcast data stream comprises arranging the broadcast data stream to have a corresponding order of the plurality of broadcast services associated with continuous data frames in the broadcast data stream being repeated in the broadcast data stream.

9. The method of claim 7, wherein the storing comprises storing a data frame in each of the plurality of buffers in an evenly cyclical turn.

10. A method for receiving a broadcast service in a mobile communication system which outer-codes frames for a plurality of broadcast services, the method comprising the steps of:
receiving a broadcast parameter message comprising information indicating at least one sub-buffer in which frames for a desired broadcast service are stored; and
selectively receiving the frames for the desired broadcast service based on the information.

11. The method of claim 10, further comprising the step of:
decoding the selectively received frames.

12. The method of claim 10, further comprising the step of:
mapping the sub-buffer to a corresponding sub-block mask based on the broadcast parameter message.

13. The method of claim 10, wherein the information indicating a specific sub-buffer comprises mask information per sub-block.

14. The method of claim 10, wherein the broadcast parameter message comprises mask information of a super frame period predefined for a plurality of sub-blocks.

15. The method of claim 10, wherein the step of selectively receiving the frames for the desired broadcast service further comprises the steps of:
calculating a sub-block index for the received broadcast frames; and
checking a mask value of a sub-block mask corresponding to a position of the sub-block index to determine whether to receive corresponding broadcast frames.

16. The method of claim 15, wherein the sub-buffer index is calculated by
sub_block_index=($i$ mod 4)+4×($\lfloor i/64 \rfloor$ mod TDM_SUB_BLOCK_PERIOD)
where 'mod' means a modulo operation, '$\lfloor$ $\rfloor$' means an integer being equal to a value of i/64 or a maximum integer approximating the value, and TDM_SUB_BLOCK_PERIOD means a period of 4 predefined TDM sub-blocks.

17. A transmission apparatus for providing a broadcast service in a mobile communication system which outer-codes frames for a plurality of broadcast services, the apparatus comprising:
a message generator for generating a broadcast parameter message comprising information indicating each sub-buffer in which frames for each broadcast service are stored; and
a radio frequency (RF) module for transmitting the broadcast parameter message.

18. The transmission apparatus of claim 17, wherein the information indicating each sub-buffer includes mask information per sub-block.

19. The transmission apparatus of claim 18, wherein the broadcast parameter message includes mask information of a super frame period predefined for a plurality of sub-blocks.

20. The transmission apparatus of claim 17, wherein if sub-block based TDM transmission and slot based TDM transmission are selectively used, the message generator inserts, into the broadcast parameter message, an indicator indicating whether to perform the sub-block based TDM transmission using a reversed bit of another broadcast parameter message defined in the slot based TDM transmission.

21. A transmission apparatus for providing a broadcast service in a mobile communication system which outer-codes frames for a plurality of broadcast services, the apparatus comprising:
- a controller for demuxing broadcast data per sub-blocks to assign the broadcast data to at least one sub-buffer in which frames for a requested broadcast service are stored;
- an outer encoder for outer-coding the frames for the plurality of broadcast services per sub-buffers; and
- a radio frequency (RF) module for transmitting the outer-coded frames for the plurality of broadcast services.

22. A reception apparatus for receiving a broadcast service in a mobile communication system which outer-codes frames for a plurality of broadcast services, the apparatus comprising:
- a radio frequency (RF) module for receiving from a transmitter a broadcast parameter message comprising information indicating a specific sub-buffer in which frames for a desired broadcast service are stored and selectively receiving the frames for the desired broadcast service among the plurality of broadcast service;
- a decoder for decoding the selectively received frames for a broadcast service, stored in the indicated sub-buffer; and
- a controller for instructing the radio frequency (RF) module selectively to receive the frames for the desired broadcast service among the plurality of broadcast service based on the information.

23. The reception apparatus of claim 22, wherein the information indicating a specific sub-buffer comprises mask information per sub-block.

24. The reception apparatus of claim 23, wherein the broadcast parameter message comprises mask information of a super frame period predefined for a plurality of sub-blocks.

25. The reception apparatus of claim 22, wherein the controller calculates a sub-block index for the received broadcast frames and a mask value of the sub-block mask corresponding to a position of the sub-block index to determine whether to receive corresponding broadcast frames.

26. The reception apparatus of claim 25, wherein the sub-block index is calculated by $$\text{sub\_block\_index} = (i \bmod 4) + 4 \times (\lfloor i/64 \rfloor \bmod \text{TDM\_SUB\_BLOCK\_PERIOD})$$

where 'mod' means a modulo operation, '$\lfloor \ \rfloor$' means an integer being equal to a value of $i/64$ or a maximum integer approximating the value, and TDM_SUB_BLOCK_PERIOD means a period of 4 predefined TDM sub-blocks.

* * * * *